(No Model.)
O. R. CHASE.
MACHINE FOR SHAPING AND MOLDING PLASTIC MATERIALS.
No. 484,777. Patented Oct. 25, 1892.
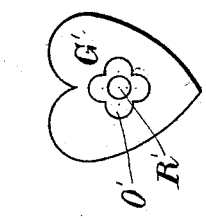
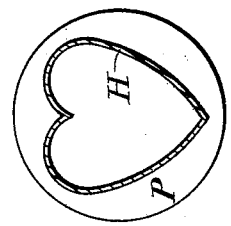
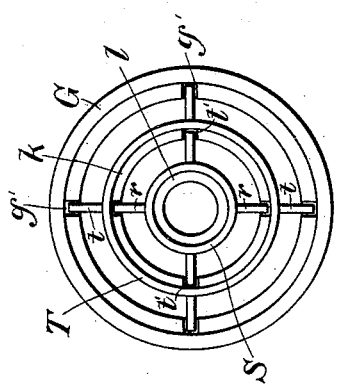
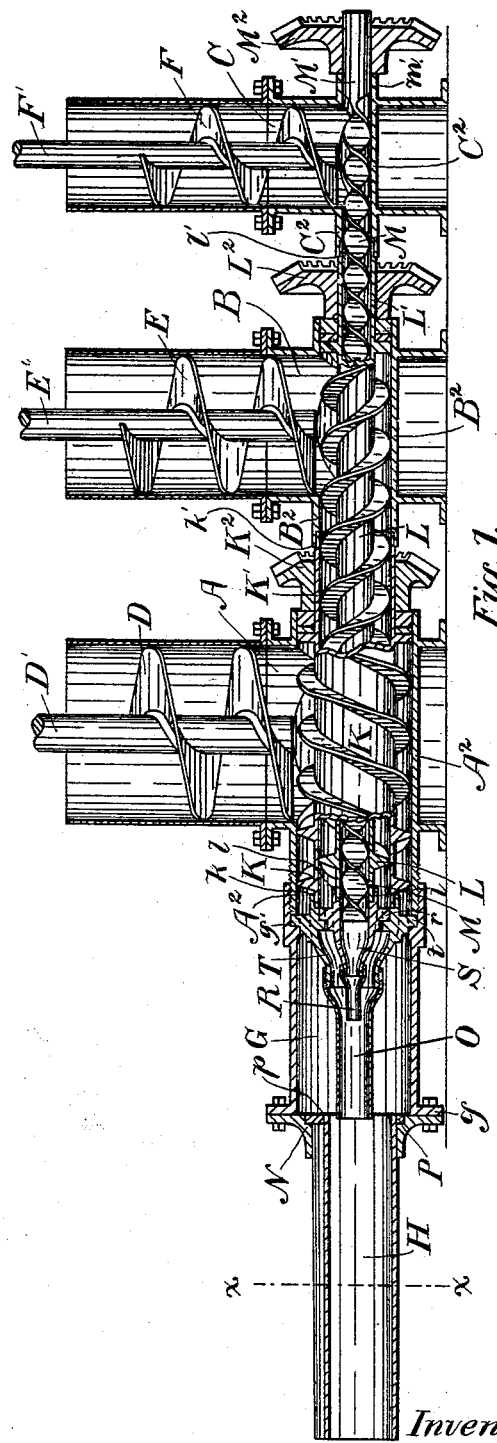
Witnesses
Albert E. Leach
E. H. Gilman
Inventor
Oliver R. Chase
by Wm. H. Downs
Atty

UNITED STATES PATENT OFFICE.

OLIVER R. CHASE, OF BOSTON, MASSACHUSETTS, ASSIGNOR TO THE ALGONQUIN MANUFACTURING COMPANY, OF PORTLAND, MAINE.

MACHINE FOR SHAPING AND MOLDING PLASTIC MATERIALS.

SPECIFICATION forming part of Letters Patent No. 484,777, dated October 25, 1892.

Application filed February 17, 1892. Serial No. 421,830. (No model.)

*To all whom it may concern:*

Be it known that I, OLIVER R. CHASE, of Boston, county of Suffolk, and State of Massachusetts, have invented certain new and useful Improvements in Machines for Shaping and Molding Plastic Materials, of which the following is a full specification.

My invention consists in certain improved features of construction in machines of the class shown and described in my United States Letters Patent, No. 279,133, dated June 12, 1883, for a machine for molding, shaping, and combining confectionery and other plastic materials, my improvements having special reference to the adaptation of a machine of this class to the smooth molding and shaping of soap and to the production of a more intricate and perfectly-formed design therein than is possible with the construction shown in said Letters Patent No. 279,133. In the last-mentioned patent the design-shaping nozzle forming the outlet to the inner horizontal feeding-screw is not held firmly enough within the outer nozzle to admit of any but the simplest designs being perfectly produced, for under the enormous twisting or torsional pressure in opposite direction to which the two differently-colored materials are subjected before being combined in one mass it is of the utmost importance in producing perfect designs that both the inner and the outer nozzles are held perfectly rigid and firm, while at the same time easily detachable to admit of producing designs of varying size and shape. Furthermore, in said patent, No. 279,133, the inner nozzle, which shapes the design, and the outer nozzle, which determines the form or outline of the stick or bar of confectionery, soap, or other plastic material, are not properly arranged with reference to each other to perfectly produce a finished design of anything but the simplest nature, since it is obvious from the construction therein shown and described that the entire mass as it passes through the conical nozzle D² is further compressed after the material for the design has passed out of the inner nozzle and become a part of said mass, with the result that the design thus produced tends to become distorted. It will be noticed, also, by reference to said Patent No. 279,133 that the outer discharge-nozzle D³, which consists of a short conical collar, after compressing the confectionery, soap, or other material through a short distance of its length abruptly discharges it into the air, with the result that, the back-pressure in the cylinders being thus quickly reduced, the material is not combined in a perfectly-smooth mass, (unless it is soft or pasty,) but is apt to be cracked or uneven, especially around the edges, in the case of material having the consistency of soap, for instance. It is to obviate these difficulties that I have made the improvements herewith shown and hereinafter described in detail, which, while especially adapted to machines for the production of soap of fine grades, is equally applicable to machines for working many other plastic materials.

Referring to the accompanying drawings, Figure 1 is a longitudinal sectional view of an apparatus embodying my invention. Fig. 2 is an end view of the cylinder within which the design-forming nozzles are contained, showing the dogs which hold said nozzles. Fig. 3 is an enlarged section in the plane of $x$ $x$, Fig. 1. Figs. 4 and 5 are end views of the design-forming nozzles, and Fig. 6 shows a cake of soap produced.

A, B, and C are three vertical receiving-cylinders, of which A is the cylinder for the material to form the outer portion of the soap stick, while B and C are to contain different-colored soap material for the interior design.

A² B² C² are horizontal cylinders integral, respectively, with the vertical cylinders A, B, and C, in axial line therewith, said cylinders A² B² C² closing the bottoms of the cylinders A, B, and C and communicating therewith upon their upper sides.

D, E, and F are three feed-screws or screw-pistons, working, respectively, in the cylinders A, B, and C and secured on the vertical revoluble sleeve-shafts D', E', and F', whereby they are caused to revolve within said cylinders.

K, L, and M are three horizontal double-threaded feed-screws, of which K and L are hollow cylinders with spirals on the outside thereof, the screw K being revoluble within the cylinder A², the screw L being revoluble within the hollow interior of the screw K and within the cylinder B², and the screw M being revoluble within the hollow interior of the screw L and within the cylinder C². Said screws K, L, and M have rearwardly-extending plain cylindrical ends K', L', and M', which are mounted in suitable bearings and have fixed thereon the bevel gear-wheels K², L², and M², respectively, which, being driven by suitable gearing, give motion to the screws in opposite directions, the spiral on the middle screw L being oppositely formed from those on the screws K and M.

The screw K has a suitable bearing at $k'$ in the horizontal cylinder B², and the screw L has an end bearing at $l'$ in the horizontal cylinder C². The construction and operation of the receiving-cylinders, with their screw-pistons, and of the horizontal cylinders, with the screws K, L, and M, are up to this point practically identical with that of the corresponding parts shown and described in my above-mentioned United States patent, No. 279,133, excepting that there are three receiving-cylinders and three sets of screws in the present case and only two in my said patent.

Of course the number of receiving-cylinders and screws is immaterial. With three cylinders and corresponding parts I am enabled to form a soap stick with three colors, there being two colors in the design.

The forward end of the cylinder A² is screw-threaded, and over this is adapted to be screwed the inner end of the removable cylinder G, the outer end of which is flanged, as at $g$, and has bolted thereto the recessed collar N.

H is the burnishing and shaping tube, having the inner flange P, which flange fits and is held in the recess of the collar N.

The removable cylinder G is provided with recesses $g'$, in which are adapted to fit the arms $t$ on the dog T, said dog T being similarly provided with recesses $t'$, within which are adapted to fit the arms $r$ on the dog S, all so arranged that the dogs T and S are firmly held within the removable cylinder G when the same is screwed onto the cylinder A², but may readily be detached from said removable cylinder and replaced by other dogs of different sizes when required.

The screw K, which has its rear bearing at $k'$ in the cylinder B², bears in front in the recessed portion $k$ of the dog T, while the screw L, which has its rear bearing at $l'$ in the cylinder C², bears in front in the recessed portion $l$ in the dog S.

The removable cylinder G forms a continuation of the cylinder A², being of the same interior diameter as said cylinder. In like manner the inner end of the dog T forms a continuation of and is of practically the same diameter as the interior of the screw K, and the dog S forms in the same way a continuation of the interior of the screw L, in which the screw M revolves.

The dogs S and T serve to hold firmly the design-forming nozzles R and O, which are respectively screwed to said dogs, the construction being such that the passage-way forward from each horizontal screw K, L, and M starts with the outer diameter of the screw and narrows down toward the outer end.

The outer burnishing and shaping tube H is considerably smaller than the removable cylinder G, forming, as herein shown, a shoulder at $p$. This contracts the passage-way for the soap fed out by the large screw K.

The small screw M feeds the soap forward from the cylinder C into the dog S, through which it passes into and through the nozzle R, being considerably contracted in sectional area after it leaves the screw. For a considerable portion of its length, however, the nozzle R preferably has practically the same sectional area near the discharge end thereof.

The middle screw L feeds its soap from the cylinder B into the dog T, through which it passes into and through the nozzle O, around the dog S and the nozzle R, the soap from said nozzle O being compacted by the narrowing down of the passage and pressed upon the soap delivered from the nozzle R.

The nozzle O is extended sufficiently far forward to enter the shaping and burnishing tube H, which is of proper section to form the exterior mass of the soap into the desired shape. The soap fed from the cylinder A by the screw K passes through the removable cylinder G, around the dog T and the nozzle O, and, meeting the shoulder $p$, is compacted and pressed upon the soap issuing from said nozzle O, the whole mass being fed out in a continuous bar through the shaping and burnishing tube H, which forms the outlet to the machine.

The nozzle R extends far enough forward so that it terminates in the portion of the nozzle O that is of uniform sectional area, while, as above said, the nozzle O is extended till it enters the burnishing and forming tube H, which is preferably of uniform sectional area throughout. By this construction it will be seen that as the soap passes from each nozzle it is not further contracted in area after being enveloped in soap from the next larger nozzle or passage-way, the construction having taken place in each case before being discharged from the nozzle.

The employment of a long burnishing and forming tube H instead of a short conical nozzle like that represented by D² in my said patent, No. 279,133, is of great importance for the reason that with a short nozzle the outer soap material, after being pressed on the design portion, is at once discharged into the outer air. This constantly reduces the back-pressure in the upright cylinder and has a tendency to cause the soap to be cracked and uneven. With a long smooth tube H of uniform size throughout the friction of the soap bar in passing through the tube keeps up the pressure through the cylinders, and the soap as it issues from the tube is of very fine texture, being perfectly smooth and even, and possesses at the same time a brilliant luster, so that the tube acts as a burnisher as well as a shaper. The tubular extensions of the design-forming nozzles O and R in like manner serve to keep the designs smooth and distinct, acting to some extent in the same manner as the shaping and burnishing tube H.

By the words "tube" and "tubular" I do not necessarily mean of circular section. Indeed, the burnishing and forming tube H may be of any desired shape. As herein shown it is heart-shaped in section, Fig. 6 showing a cake of soap cut from a bar as delivered from such an apparatus as that shown and described, in which G' is the outer soap material fed from the cylinder A, O' a soap of different color fed from the cylinder B, and R' a soap of still different color fed from cylinder C, the nozzles O and R being of required shape to mold the design.

The design-forming nozzles, as well as the dogs which hold them, are readily removable, as will be seen, and on account of the positive manner in which the dogs are held there is no tendency of the nozzles to twist with the screws and thus mar the design.

I claim—

1. In a machine for molding and shaping plastic materials, the combination of a hollow cylinder, a feed-screw revoluble in said cylinder, and an outlet-forming burnishing and shaping tube having a forming-nozzle entering its rear end, substantially as described.

2. In a machine for molding and shaping plastic materials, the combination, with a hollow vertical feed-cylinder, of a vertical feed-screw revoluble therein, a hollow horizontal cylinder in axial line with said vertical cylinder and communicating therewith, a horizontal feed-screw revoluble in said horizontal cylinder, and an outlet-forming burnishing and shaping tube of uniform diameter, with a forming-nozzle entering its rear end, substantially as and for the purposes described.

3. In a machine for molding and shaping plastic materials, the combination of a hollow cylinder, a series of feed-screws, each revoluble in the one next larger, and a series of contracted passage-ways forming independent outlets to each screw, said passage-ways having tubular extensions, each extension being of uniform area for a considerable distance back from the outlet thereof, substantially as and for the purposes described.

4. In a machine for molding and shaping plastic materials, the combination of a hollow cylinder, a series of feed-screws, each revoluble in the one next larger, and a series of nozzle-holding and passage-forming dogs, each dog having arms seated in recesses in the passage next larger, all arranged and constructed substantially as and for the purposes described.

5. In a machine for molding and shaping plastic materials, the combination of a hollow cylinder provided with a recessed outlet-passage, a hollow cylindrical feed-screw revoluble in said cylinder, a second inner feed-screw revoluble in said hollow cylindrical feed-screw, and a passage-forming and nozzle-holding dog provided with arms seated in the recesses of said outlet-passage, said inner screw having bearings in said dog, substantially as described.

6. In a machine for molding and shaping plastic materials, a hollow cylinder provided with a feed-screw and an outlet-forming burnishing and shaping tube having compacting and pressing shoulder $p$, substantially as shown and described.

In witness whereof I have hereunto set my hand.

OLIVER R. CHASE.

Witnesses:
W. B. H. DOWSE,
ALBERT E. LEACH.